United States Patent
Yoshikawa et al.

(10) Patent No.: US 6,833,420 B1
(45) Date of Patent: Dec. 21, 2004

(54) FILM FOR WRAPPING

(75) Inventors: Kenichi Yoshikawa, Tokyo (JP); Akira Kamikuzu, Chiba (JP)

(73) Assignee: Du Pont Mitsui Polychemicals Co., Ltd., Tokyo (JP)

( * ) Notice: Subject to any disclaimer, the term of this patent is extended or adjusted under 35 U.S.C. 154(b) by 0 days.

(21) Appl. No.: 09/719,086

(22) PCT Filed: Apr. 7, 2000

(86) PCT No.: PCT/JP00/02276

§ 371 (c)(1),
(2), (4) Date: Mar. 2, 2001

(87) PCT Pub. No.: WO00/61663

PCT Pub. Date: Oct. 19, 2000

(30) Foreign Application Priority Data

Apr. 9, 1999 (JP) ............................................ 11-103239

(51) Int. Cl.$^7$ .............................................. C08F 220/10
(52) U.S. Cl. ................. 526/318.4; 526/319; 526/317.1; 526/318; 526/318.45; 526/348; 526/348.1
(58) Field of Search ............................... 526/318.4, 319, 526/317.1, 318, 318.45, 348, 348.1, 307.1, 303.1, 229.7; 524/450, 442, 444, 445, 447, 448; 523/102

(56) References Cited

FOREIGN PATENT DOCUMENTS

| EP | 0 521426 | * | 1/1993 |
| WO | WO 91/16376 | * | 10/1991 |

* cited by examiner

Primary Examiner—Tatyana Zalukeva
(74) Attorney, Agent, or Firm—Sherman & Shalloway

(57) ABSTRACT

A film having a large tensile stress in the machine direction, excellent mechanical properties and stretch-wrapping property, and that is less broken at the time of wrapping, can be favorably torn off in the transverse direction, can be intimately adhered on the container walls to be wrapped, and excellently restores its shape after it is depressed and deformed as a result of wrapping. The film for stretch-wrapping is formed of a resin composition containing, as a chief component, an ethylene/(meth)acrylic acid/(meth)acrylic acid ester terpolymer that contains not more than 7% by weight of a (meth)acrylic acid ester unit, and, optionally, containing an anti-fogging agent or a tackifier.

13 Claims, No Drawings

FILM FOR WRAPPING

TECHNICAL FIELD

This application claims priority to Japanese Patent Application No. 11-103239 filed on Apr. 9, 1999, which is incorporated herein by reference.

The present invention relates to a film for stretch-wrapping. More particularly, the invention relates to a film for stretch-wrapping comprising chiefly an ethylene—(meth)acrylic acid—(meth)acrylic acid ester terpolymer or a metal salt ionomer thereof.

BACKGROUND ART

PVC films have heretofore been chiefly used as stretchable films (for wrapping foamed polystyrene trays containing foods) for business use such as in supermarkets and convenience stores. However, from the environmental viewpoints in recent years, it has been urged to provide a substitute for the PVC. In the field of stretchable films for stretch-wrapping, the PVC films have rapidly been substituted by the olefin resin films.

Many films for stretch-wrapping have so far been proposed using an ethylene/unsaturated carboxylic acid copolymer, an ethylene/unsaturated carboxylic acid/unsaturated carboxylic acid ester terpolymer or an ionomer thereof.

Japanese Unexamined Patent Publication (Kokai) No. 134591/1978 discloses a film for wrapping of an ethylene copolymer comprising (a) an ethylene, (b) an unsaturated carboxylic acid alkyl ester, (c) an unsaturated carboxylic acid and (d) a metal salt of an unsaturated carboxylic acid, the component (a) being contained in an amount of from 90 to 98 mol %, the component (b) being contained in an amount of from 9.7 to 2.0 mol %, the component (c) being contained in an amount of from 0 to 2.5 mol %, and the component (d) being contained in an amount of from 0.3 to 2.5 mol %.

Japanese Laid-Open Patent Publication for PCT application (Kohyo) No. 506820/1992 discloses a film for wrapping comprising:

(a) at least 80% of a terpolymer of at least 50% by weight of an ethylene, 2 to 20% by weight of an unsaturated carboxylic acid having 3 to 8 carbon atoms, and 2 to 20% by weight of at least one kind of an alkyl acrylate or an alkyl methacrylate in which the alkyl group has 2 to 12 carbon atoms, or a moiety derived from a mixture thereof, 0 to 10% of the acid group of the acid group-containing moiety thereof being neutralized with at least one kind of metal ions; and (b) 0.1 to 2% by weight of at least one kind of a sorbitan fatty acid ester;

at least one surface of said film being treated with corona to a degree sufficient for producing a wet tensile force of 40 to 50 dynes/cm on the treated surface thereof.

Japanese Examined Patent Publication (Kokoku) No. 100741/1995 discloses a film for stretch-wrapping obtained by inflation-molding an ethylene methacrylate copolymer resin containing 8 to 12% by weight of a methacrylic acid and having a tensile stress of 1.1 to 1.5 times in both the machine and transverse directions when stretched by 100% and having a tensile stress of 1.5 to 2.0 times in the transverse direction when stretched by 200% with respect to the stress of when it is stretched by 50%.

Japanese Patent No. 2642583 discloses a film for stretch-wrapping comprising chiefly 50 to 99% by weight of an ethylene—(meth)acrylic acid copolymer resin and 50 to 1% by weight of an ethylene—(meth)acrylic acid—(meth)acrylic acid ester terpolymer resin and, optionally, containing an anti-fogging agent (a defogging agent) or a tackifier. There have been described that the above bipolymer alone or the terpolymer alone exhibits a 100% tensile stress that does not lie within a suitable range (110 to 170 kg/cm$^2$ in the machine direction of the film, and 60 to 110 kg/cm$^2$ in the transverse direction), and is not suited for the automatic wrapping.

The ethylene—(meth)acrylic acid bipolymer generally has a high stiffness, whereas the ethylene—(meth)acrylic acid—(meth)acrylic acid ester terpolymer has a low stiffness and is soft. This holds even for the ionomers obtained by neutralizing the above copolymers with metal ions. The ionomer of the above bipolymer is called hard ionomer, and the ionomer of the above terpolymer is called soft ionomer.

The film for stretch-wrapping disclosed in the specification of Japanese Patent No. 2642583 is obtained by mixing the above bipolymer and the terpolymer at a predetermined ratio so as to be suited for the automatic wrapping. However, these two copolymers are not necessarily compatible to each other and, hence, the external haze value tends to increase. Therefore, the film is not still satisfactory from the standpoint of seeing through the wrapped content.

Further, the film for stretch-wrapping is usually blended with an anti-fogging agent to improve the property for seeing through the content. When the ionomers of the above-mentioned copolymers are used, however, gel tends to be formed during the molding operation with the passage of time, making it difficult to prepare the film itself.

SUMMARY OF THE INVENTION

It is therefore an object of the present invention to provide a film constituted by the above-mentioned terpolymer or an ionomer thereof, having a large tensile stress in the machine direction, excellent mechanical properties and stretch-wrapping property, i.e., to provide a film for stretch-wrapping that is less broken at the time of wrapping, that can be favorably torn off in the transverse direction, that can be intimately adhered on the container walls to be wrapped, and that excellently restores its shape after it is depressed and deformed as a result of wrapping.

Another object of the present invention is to provide a film for stretch-wrapping that can be easily formed and easily treated, that is homogeneous even optically, exhibiting less external haze and enabling the content to be seen through.

A further object of the present invention is to provide a film for stretch-wrapping, which suppresses the gelling tendency when it is blended with an anti-fogging agent without impairing the appearance or without being foamed during the working.

According to the present invention, there is provided a film for stretch-wrapping formed of a resin composition containing, as a chief component, an ethylene/(meth)acrylic acid/(meth)acrylic acid ester terpolymer that contains not more than 7% by weight and, particularly, less than 5% by weight of a (meth)acrylic acid ester unit, and, optionally, containing an anti-fogging agent or a tackifier.

It is desired that the terpolymer used in the present invention contains from 5 to 20% by weight of a (meth)acrylic acid, and not less than 0.1% by weight but less than 5% by weight of a (meth)acrylic acid ester.

The film for stretch-wrapping can be prepared by the inflation method. However, the terpolymer used in the invention can be molded into a film by the T-die method offering an advantage that the film can be produced at a high speed.

According to the present invention, there is further provided a film for stretch-wrapping formed of a resin composition containing, as a chief component, an ionomer obtained by ionizing an ethylene/(meth)acrylic acid/(meth)acrylic acid ester terpolymer that contains less than 5% by weight of a (meth)acrylic acid ester unit, and, optionally, containing an anti-fogging agent or a tackifier.

It is desired that the ionomer used in the invention uses, as a base, a copolymer that contains from 5 to 20% by weight of a (meth)acrylic acid and not less than 0.1% by weight but less than 5% by weight of a (meth)acrylic acid ester, and has an ionization degree of from 0.1 to 30%.

This ionomer, too, has an advantage that it can be molded into a film by the T-die method.

DETAILED DESCRIPTION OF THE INVENTION

[Action]

The present invention uses an ethylene/(meth)acrylic acid/(meth)acrylic acid ester terpolymer or an alkali metal ionomer thereof as a resin for the film for stretch-wrapping, containing a (meth)acrylic acid ester in a limited amount such as not larger than 7% by weight and, particularly, smaller than 5% by weight.

As will be described later in Examples appearing later, it was learned that the film for stretch-wrapping formed of the terpolymer or the ionomer thereof exhibits a stress of generally from 20 to 40 MPa (196 to 392 kg/cm$^2$) when stretched by 100% in the machine direction, which is a value considerably higher than that of the traditionally used films for stretch-wrapping, thus exhibiting excellent mechanical properties and adaptability to stretch-wrapping.

That is, the film for stretch-wrapping exhibits not only improved mechanical strength in the machine direction and excellent moldability but also distinguished advantage of decreasing the thickness of the film, decreased film breakage at the time of wrapping, excellent tear-off property in the transverse direction of the film, excellent adhesiveness to the container walls that are to be wrapped, and excellent restoration after depressed and deformed as a result of wrapping.

The resin for film used in the invention is prepared by the direct polymerization of an ethylene, a (meth)acrylic acid and a (meth)acrylic acid ester, and has very homogeneous composition and distribution as compared with a resin composition prepared by blending a bipolymer and a terpolymer, can be favorably molded into the film and can be favorably worked. Besides, the film for stretch-wrapping that is formed is homogeneous even optically, exhibiting less external haze and offering advantage that the content can be favorably seen through.

The present invention uses the ionomer of the above terpolymer. Here, however, it is important that the ionomer is the one that is neutralized with an alkali metal. The ionomer has a structure in which the copolymer is ionically crosslinked at the portions of acid groups, and it is believed that the ionically crosslinked structure helps improve the above-mentioned adaptability to stretch-wrapping without spoiling the moldability into films. As a cationic seed used for introducing the ionically crosslinked structure, there can be used an alkali metal, an alkaline earth metal or zinc. In the ionomer using zinc or alkaline earth metal, however, there takes place a reaction with the anti-fogging agent blended in the film, deteriorating the film-forming property and appearance. According to the present invention, on the other hand, an alkali metal is selected as a metal seed for the ionomer, suppressing the reaction with the anti-fogging agent and improving the film-forming property and appearance.

[Terpolymer]

The present invention uses an ethylene/(meth)acrylic acid/(meth)acrylic acid ester terpolymer containing not more than 7% by weight and, most desirably, from 0.1 to (less than) 5% by weight of a (meth)acrylic acid ester.

When the bipolymer without containing the (meth)acrylic acid ester unit is used, the film exhibits increased stiffness and is broken at the time of wrapping and is restored little after the film is depressed and deformed as a result of wrapping.

When the content of the (meth)acrylic acid ester exceeds the above range, on the other hand, the object of the present invention is not accomplished which is to provide a high-stress film for stretch-wrapping, and the adaptability to stretch-wrapping decreases.

In the present invention, examples of the (meth)acrylic acid ester used for the terpolymer include methyl acrylate, ethyl acrylate, isopropyl acrylate, n-butyl acrylate, isobutyl acrylate, isooctyl acrylate, methyl methacrylate, ethyl methacrylate and isobutyl methacrylate.

Among these (meth)acrylic acid esters, there can be preferably used a (meth)acrylic acid ester in which the alkyl group has 1 to 10 carbon atoms and, particularly, an isobutyl (meth)acrylate.

It is desired that the terpolymer contains the (meth)acrylic acid in an amount of from 5 to 20% by weight and, preferably, from 8 to 15% by weight.

When the content of the (meth)acrylic acid is smaller than the above range, the stress when the film is stretched tends to become smaller than the above range. When the content of the (meth)acrylic acid is larger than the above range, on the other hand, the stress when the film is stretched tends to exceed the above range. In either case, the adaptability to stretch-wrapping becomes inferior as compared to when the content lies within the above-mentioned range.

It is desired that the terpolymer has a melt flow rate (JIS K6760) of from 0.1 to 100 g/10 minutes and, particularly, from 0.2 to 30 g/10 minutes from the standpoint of mechanical properties of the film and moldability into films.

The terpolymer used in the present invention is prepared by the direct polymerization of an ethylene, a (meth)acrylic acid and a (meth)acrylic acid ester like the method of preparing a high-pressure method polyethylene.

[Ionomer]

In the present invention, the alkali metal ionomer of the terpolymer, too, is used as the resin for forming the film. The terpolymer has the composition and properties as described above.

The ethylene/(meth)acrylic acid/(meth)acrylic acid ester terpolymer has an ionization degree of from 0.1 to 30%, preferably, from 0.1 to 10% and, particularly preferably, from 0.1 to 5%.

When the ionization degree exceeds the above range, the ionomer absorbs moisture developing inconvenience such as foaming at the time of machining.

The importance for using the alkali metal as an ionic seed for the ionomer was described already. As the alkali metal in the ionomer, there can be exemplified lithium, sodium and potassium.

The terpolymer can be ionized by using various kinds of compounds of an alkali metal, such as oxide, hydroxide, carbonate, bicarbonate, salt of fatty acid and the like. The ionization is conducted in accordance with a widely known method of preparing ionomers.

It is desired that the ionomer has a melt flow rate (JIS K6760) of from 0.1 to 100 g/10 min. and, particularly, from 0.2 to 30 g/10 min. from the standpoint of mechanical properties and moldability into films.

[Film for Stretch-wrapping and Method of its Preparation]

The film for stretch-wrapping can be prepared by melt-extruding the above-mentioned terpolymer or the ionomer thereof and molding it into a film.

The resin for forming the film comprises, as a chief component, the above-mentioned terpolymer or the ionomer thereof. Concretely, the film may comprise greater than 50 wt %, preferably greater than 70 wt % of the terpolymer or the ionomer thereof. Most preferably, the resin for forming the film consists essentially of the terpolymer or the ionomer thereof.

The resin for forming the film may be optionally blended with an anti-fogging agent for better see through of the content irrespective of the presence of water or a tackifier for imparting tackiness to the film.

As the anti-fogging agent, there can be exemplified any anti-fogging agent that has been known per se. such as the one of the type of glycerin fatty acid ester, sorbitan fatty acid ester, di- or polyglycerin fatty acid ester and ethylene oxide adduct, to which only, however, the anti-fogging agent is in no way limited.

The anti-fogging agent can be blended in an amount of from 0.1 to 10 parts by weight and, particularly, from 0.1 to 8 parts by weight per 100 parts by weight of the resin for forming the film.

As the tackifier, there can be exemplified aliphatic hydrocarbon resin, aromatic hydrocarbon resin, aliphatic/aromatic copolymerizable hydrocarbon resin, alicyclic hydrocarbon resin, synthetic terpene hydrocarbon resin, terpene hydrocarbon resin, cumarone-indene hydrocarbon resin, low-molecular styrene resin, rosin hydrocarbon resin, or combinations thereof, to which only, however, the tackifier is not limited, as a matter of course.

The tackifier can be blended in an amount of from 0.1 to 15 parts by weight and, particularly, from 0.1 to 10 parts by weight per 100 parts by weight of the resin for forming the film.

The resin for forming the film of the present invention can be blended with widely known resin blending agents, such as coloring agent, heat stabilizer, weather resistance stabilizer, antioxidant, anti-aging agent, photo-stabilizer, ultraviolet absorber, anti-static agent, lubricant such as metal soap or wax, reforming resin or rubber, and the like according to a known recipe.

The film for stretch-wrapping of the present invention has a feature in that it exhibits a stress of from 20 to 40 MPa when it is stretched by 100% in the machine direction (MD) thus exhibiting a stress that lies within a high range when it is stretched in the mechanical direction.

The film for stretch-wrapping of the present invention, on the other hand, exhibits a stress that is suppressed to lie within a low range of from 5 to 20 MPz when it is stretched by 100% in the transverse direction (TD).

Thus, the film for stretch-wrapping of the present invention exhibits a ratio (MD/TD) of the stress in the machine direction to the stress in the transverse direction of from 2 to 8 when it is stretched by 100%, featuring a large anisotropy in the tensile stress and, hence, offering advantage as described above and advantage in the productivity as will be described later.

The film for stretch-wrapping of the invention exhibits a large tensile stress in the machine direction and permits the thickness of the film to be considerably decreased. The film can be used having a thickness of, generally, from 5 to 20 $\mu$m and, particularly, from 7 to 18 $\mu$m though it may vary depending upon the applications.

The film for stretch-wrapping of the invention can be produced by the inflation method. However, the terpolymer used in the invention can be formed into a film by the T-die method at a high speed, which is an advantage.

In forming the film, the resin is heated at a temperature higher than its melting point but lower than its decomposition temperature, and is, generally, heated over a range of from 180 to 240° C.

That is, the terpolymer or the ionomer thereof is formed into the film by the T-die cast method, and the film that is formed is taken up at a high speed so as to be stretched in the machine direction. According to the present invention, therefore, the film can be produced at a speed of 150 m/min or faster, which is superior in the productivity to the production at a speed of 50 m/min. at the greatest by the inflation method.

The terpolymer and the ionomer thereof used in the present invention exhibits excellent moldability, and give no inconvenience when it is molded into a film for stretch-wrapping even by the inflation method.

EXAMPLES

The present invention will now be concretely described by way of Examples to which only, however, the invention is in no way limited.

1. Starting Materials (1) Ethylene/methacrylic acid/isobutyl acrylate copolymer (E/MAA/iBA).

| | |
|---|---|
| Methacrylic acid | 10% by weight |
| Isobutyl acrylate | 3% by weight |
| MFR | 8.5 g/10 min. |

(2) Ionomer ①

Base polymer: ethylene/methacrylic acid/isobutyl acrylate copolymer (methacrylic acid=10% by weight, isobutyl acrylate=3% by weight)

| | |
|---|---|
| Metallic ion seed | sodium |
| Ionization degree | 2% |
| MFR | 7.9 g/10 min. |

(3) Ionomer ②

Base polymer: ethylene/methacrylic acid/isobutyl acrylate copolymer (methacrylic acid=10% by weight, isobutyl acrylate=10% by weight)

| | |
|---|---|
| Metallic ion seed | sodium |
| Ionization degree | 36% |
| MFR | 1.1 g/10 min. |

(4) Ionomer ③

Base polymer: ethylene/methacrylic acid copolymer (methacrylic acid=10% by weight)

| | |
|---|---|
| Metallic ion seed | sodium |
| Ionization degree | 50% |
| MFR | 1.3 g/10 min. |

(5) Ionomer ④

Base polymer: ethylene/methacrylic acid/isobutyl acrylate copolymer (methacrylic acid=10% by weight, isobutyl acrylate=3% by weight)

| | |
|---|---|
| Metallic ion seed | magnesium |
| Ionization degree | 2% |
| MFR | 8.0 g/10 min. |

(6) Ionomer ⑤

Base polymer: ethylene/methacrylic acid/isobutyl acrylate copolymer (methacrylic acid=10% by weight, isobutyl acrylate=3% by weight)

| | |
|---|---|
| Metallic ion seed | zinc |
| Ionization degree | 2% |
| MFR | 8.0 g/10 min. |

2. Working Method

A mixture of 98% by weight of the above resin and 2% by weight of a diglycerin oleate (O-71DE manufactured by Riken Vitamin Co.) was formed into films using the apparatuses described below.

| * T-die method. | |
|---|---|
| Extruder | 65 mm in diameter (L/D = 32) screw full-flighted type |
| Die | coat hanger type (900 mm wide) |

The working temperature was set to 225° C. (resin temperature) and the thickness of the film was selected to be 12 μm. Further, the take-up speed was set to be 165 m/min.

| *Inflation method. | |
|---|---|
| Extruder | 50 mm in diameter (L/D = 28) screw 3-stage type |
| Die | 150 mm in diameter, spiral type |

The working temperature was set to 200° C. (resin temperature) and the thickness of the film was selected to be 12 μm. Further, the take-up speed was set to be 20 m/min.

3. Items to be Evaluated and Results

Moldability during the working was evaluated concerning the following items. The results were as shown in Tables 1 and 2.

(1) Reactivity with the Anti-fogging Agent.

It was examined whether a gel was formed upon the reaction with the anti-fogging agent during the molding.
   ○: No gel was formed
   X: Gel was formed with the passage of time (2) Cleavage in the Film.

It was examined whether the film was cleaved due to scars in the film during the molding.
   ○: Could be stably worked at a high speed.
   X: Cleaved along the scars during the working, and could not be stably worked at a high speed.

(3) Appearance of the Film.

The appearance of the film was examined during the molding.
   ○: The film was maintained smooth.
   X: The surface of the film became rugged due to gel and lumps.

The handling of the pellets used was evaluated concerning the following items. The results were as shown in Tables 1 and 2.

(1) Hygroscopic Property.

In order to evaluate defects such as foaming, etc. at the time of forming the ionomer into a film, the saturated amount of water was measured when the pellets were left to stand on the site of working.
   ○: The saturated amount of water was smaller than 1000 ppm in an atmosphere of 30° C., 90% RH.
   X: The saturated amount of water exceeded 1000 ppm under the same conditions.

The films that were formed were measured for their film properties under the following conditions.

(1) Stress of when the Film was Stretched.

Dumbbell No.1 dumbbell specified under JIS K7113
Crosshead speed 200 m/min.

The wrapping test was conducted by using trays of a foamed styrene and an automatic wrapping machine (AW-3600 manufactured by Teraoka Seikosha Co.) to evaluate the following items. The results were as shown in Tables 1 and 2.

(1) Film Cutting Property.

The film was cut using a paper saw or a metal saw to evaluate the easiness of cutting.
   ○: The film was sharply cut in the transverse direction.
   X: The film was not sharply cut in the transverse direction.

(2) Breakage of Film.

The wrapping test was conducted while variously changing the tension of the film to observe the appearance.
   ○: The film was not broken.
   X: The film was broken.

(3) Wrinkles on the Film when Packaged.

Adhesion to the foamed styrene container was observed.
   ○: Film adhered tightly without floating.
   X: Film floated.

(4) Restoring Property After Depressed with Fingers.

The upper surface of the film wrapping the container was depressed with a predetermined pressure by a finger. The finger was then released so that the film restored, and the mark made by the finger was observed.
   ○: There remained no mark of finger.
   X: There remained the mark of finger.

TABLE 1

| | Example 1 | Example 2 | Example 3 | Example 4 |
|---|---|---|---|---|
| Resin | E/MAA/iBA | E/MAA/iBA | ionomer ① | ionomer ② |
| Working method | T-die | inflation | T-die | inflation |
| Reactivity with anti-fogging agent | ○ | ○ | ○ | ○ |
| Cutting property of film | ○ | ○ | ○ | ○ |
| Appearance of film | ○ | ○ | ○ | ○ |

TABLE 1-continued

|  | Example 1 | Example 2 | Example 3 | Example 4 |
|---|---|---|---|---|
| Hygroscopic property of pellets | ○ | ○ | ○ | ○ |
| Film properties Tensile stress |  |  |  |  |
| 50% | 20/6.6 | 17/7.0 | 21/6.7 | 18/7.1 |
| (MD/TD) 100% | 25/7.2 | 22/7.5 | 26/7.5 | 23/7.7 |
| [Mpa] 200% | —/8.8 | —/8.8 | —/8.9 | —/8.6 |
| Adaptability to wrapping machine Cutting property | ○ | ○ | ○ | ○ |
| Breakage | ○ | ○ | ○ | ○ |
| Wrinkles | ○ | ○ | ○ | ○ |
| Restoration after depressed with finger | ○ | ○ | ○ | ○ |

TABLE 2

|  | Comp.Ex.1 | Comp.Ex.2 | Comp.Ex.3 | Comp. Ex.4 |
|---|---|---|---|---|
| Resin | ionomer ② | ionomer ③ | ionomer ④ | ionomer ⑤ |
| Working method | T-die | T-die | T-die | T-die |
| Reactivity with anti-fogging agent | ○ | ○ | X | X |
| Cutting property of film | ○ | ○ | X | X |
| Appearance of film | ○ | ○ | X | X |
| Hygroscopic property of pellets | X | X | ○ | ○ |
| Tensile stress |  |  |  |  |
| 50% | —/— | —/— | —/— | —/— |
| (MD/TD) 100% | —/— | —/— | —/— | —/— |
| [MPa] 200% | —/— | —/— | —/— | —/— |
| Adaptability to wrapping machine Cutting property | — | — | — | — |
| Breakage | — | — | — | — |
| Wrinkles | — | — | — | — |
| Restoration after depressed with finger | — | — | — | — |

Field of Utilization in Industry

According to the present invention, an ethylene/(meth)acrylic acid/(meth)acrylic acid ester terpolymer containing a (meth)acrylic acid ester in an amount within a predetermined range or an ionomer thereof is used for a film for stretch-wrapping. Therefore, the film for stretch-wrapping exhibits a large tensile stress in the machine direction, excellent mechanical properties and excellent adaptability to stretch-wrapping.

That is, the film breaks little during the wrapping, can be favorably torn off in the transverse direction, intimately and favorably adheres onto the walls of the container that is to be wrapped, and favorably restores after depressed and deformed as a result of wrapping.

The resin for forming the film is produced by the direct polymerization of the above-mentioned three components, has a homogeneous composition, can be favorably molded into a film and can be favorably worked. Besides, the film for stretch-wrapping that is formed is homogeneous even optically, exhibits less external haze and excellently permits the content to be seen through.

Even when the ionomer is used as a resin for forming the film, the gelling tendency is suppressed when the anti-fogging agent is blended, exhibiting excellent appearance and hygroscopic property.

Thus, the film for stretch-wrapping of the invention is useful for wrapping sea foods, meats, vegetables, fruits and daily dishes placed on or contained in the plastic trays.

What is claimed is:

1. A film for stretch-wrapping formed of a resin composition containing, as a chief component, an ethylene/(meth)acrylic acid/(meth)acrylic acid ester terpolymer that contains not more than 7% by weight of a (meth)acrylic acid ester unit, wherein the forming of said film is effected according to T-die cast method and the film has a stress in a machine direction (MD) of said film within a range of from 20 to 40 MPa when the film is stretched by 100%, and a ratio (MD/TD) of stress in the machine direction to the stress in a traverse direction within a range of from 2 to 8 when the film is stretched by 100% in each of said directions and having a film thickness of 5 to 20 μm.

2. The film for stretch-wrapping according to claim 1, wherein said terpolymer is the one that contains less than 5% by weight of a (meth)acrylic acid ester unit.

3. The film for stretch-wrapping according to claim 2, wherein said terpolymer is the one that contains from 5 to 20% by weight of a (meth)acrylic acid unit, and not less than 0.1% by weight but less than 5% by weight of a (meth)acrylic acid ester unit.

4. The film for stretch-wrapping according to 3, wherein said terpolymer is the one that contains from 8 to 15% by weight of a (meth)acrylic acid unit.

5. The film for stretch-wrapping according to claim 1, wherein the alkyl group of the (meth)acrylic acid ester has from 1 to 10 carbon atoms.

6. The film for stretch-wrapping according to claim 1, the film further containing an anti-fogging agent or a tackifier.

7. A film for stretch-wrapping formed of a resin composition containing, as a chief component, an ionomer obtained by ionizing with an alkali metal, an ethylene/(meth)acrylic acid/(meth)acrylic acid ester terpolymer that contains not less than 5% by weight of a (meth)acrylic acid ester unit, wherein the forming of said film is effected according to T-die cast method and the film has a stress in machine direction (MD) of said film within a range of from 20 to 40 MPa when the film is stretched by 100%, and a ratio of the stress in machine direction to the stress in a traverse direction within a range of from 2 to 8 when the film is stretched by 100% in each of said directions and having a film thickness of 5 to 20 μm.

8. The film for stretch-wrapping according to claim 7, wherein said terpolymer is the one that contains from 5 to 20% by weight of a (meth)acrylic acid unit, and not less than 0.1% by weight but less than 5% by weight of a (meth)acrylic acid ester unit, and the ionomer has an ionization degree of 0.1 to 30.

9. The film for stretch-wrapping according to claim 8, wherein said terpolymer is the one that contains from 8 to 15% by weight of a (meth)acrylic acid unit.

10. The film for stretch-wrapping according to claim 7, wherein the alkyl group of the (meth)acrylic acid ester has from 1 to 10 carbon atoms.

11. The film for stretch-wrapping according to claim 7, the film further containing an anti-fogging agent or a tackifier.

12. The film for stretch-wrapping according to claim 1, wherein the film has a stress in a machine direction (MD) within a range of from 25 to 40 MPa when the film is stretched by 100%.

13. The film for stretch-wrapping according to claim 7, wherein the film has a stress in a machine direction (MD) within a range of from 25 to 40 MPa when the film is stretched by 100%.

* * * * *